US012258258B2

(12) United States Patent
Najafi et al.

(10) Patent No.: US 12,258,258 B2
(45) Date of Patent: Mar. 25, 2025

(54) BEVERAGE DISPENSER FLUID LEVEL SENSOR

(71) Applicant: 7-Eleven, Inc., Irving, TX (US)

(72) Inventors: Pirooz Najafi, Plano, TX (US); John Robert Keller, Plano, TX (US); Matthew O'Daniel Redmond, Denton, TX (US)

(73) Assignee: 7-ELEVEN, INC., Irving, TX (US)

( * ) Notice: Subject to any disclaimer, the term of this patent is extended or adjusted under 35 U.S.C. 154(b) by 462 days.

(21) Appl. No.: 17/455,881

(22) Filed: Nov. 19, 2021

(65) Prior Publication Data

US 2023/0159317 A1 May 25, 2023

(51) Int. Cl.
*B67D 1/08* (2006.01)
*B67D 1/00* (2006.01)
*B67D 1/12* (2006.01)

(52) U.S. Cl.
CPC ............. *B67D 1/0878* (2013.01); *B67D 1/12* (2013.01); *B67D 2001/0092* (2013.01); *B67D 2001/0097* (2013.01); *B67D 2001/1265* (2013.01)

(58) Field of Classification Search
CPC ............................... B67D 1/0878; B67D 1/12; B67D 2001/0092; B67D 2001/0097; B67D 2001/1265
See application file for complete search history.

(56) References Cited

U.S. PATENT DOCUMENTS 6,992,590 B1 * 1/2006 Tietsworth ........... B67D 1/0032 340/539.22
11,066,286 B1 * 7/2021 Mullenaux ........... A47C 19/022
11,673,787 B1 * 6/2023 Volftsun .................. G01F 23/30 222/52
2006/0208913 A1 * 9/2006 Christoffersen ..... B67D 1/0878 340/614
2009/0031901 A1 * 2/2009 Peden .................. B67D 1/0888 222/64
2016/0325867 A1 * 11/2016 Trundle ............... B67D 1/0011
2017/0144877 A1 * 5/2017 Rider ................... B67D 3/0051
2019/0270630 A1 * 9/2019 Dahan ..................... E03C 1/057
2019/0300355 A1 * 10/2019 Pappas ................. B67D 1/0878
2021/0221667 A1 * 7/2021 Venkatakrishnan ......................... G06Q 20/209
2023/0162160 A1 * 5/2023 Quraishi .......... G06Q 10/06313 705/7.23
2023/0271819 A1 * 8/2023 Lee ...................... B67D 1/0868 222/129.1

* cited by examiner

*Primary Examiner* — Jeremy Carroll
(74) *Attorney, Agent, or Firm* — Baker Botts L.L.P.

(57) ABSTRACT

A system includes a sensor and a computing system. The sensor is coupled to a syrup line of the beverage dispenser and is configured to measure a pressure within the line. The syrup line is coupled at a first end to a syrup bag and at a second end to a pump configured to pump syrup from the syrup bag to an outlet of the beverage dispenser. The pump is operated using pressurized gas and generates a pressure corresponding to the pressure of the gas within the syrup line when both the syrup bag is full and the outlet of the beverage dispenser is closed. The sensor transmits a measured pressure to the computing system. The computing system determines that the measured pressure is less than a threshold pressure. In response, the processor transmits an alert for display on a user device, which identifies the syrup bag for replacement.

7 Claims, 3 Drawing Sheets

BEVERAGE DISPENSER FLUID LEVEL SENSOR

TECHNICAL FIELD

The present disclosure relates generally to sensors, and more specifically to a beverage dispenser fluid level sensor.

BACKGROUND

Beverage dispensers, such as fountain drink dispensers, typically operate by combining flavored syrup, carbon dioxide, and water, and dispensing the combination through a nozzle. The flavored syrup is typically stored in a syrup bag, housed within a box—a bag-in-box ("BIB"). For beverage dispensers that dispense different types of drinks, the volume needed to store the associated syrup BIBs may be quite large. Accordingly, the syrup BIBs are often stored in a separate room from the beverage dispenser, on a BIB rack. This may make it difficult and/or time consuming for a worker within a building in which the beverage dispenser is stored to proactively monitor the syrup BIBs and determine when a given syrup bag is close to empty and should be replaced.

SUMMARY

This disclosure contemplates a beverage dispenser sensor system that is configured to automatically monitor a beverage dispenser and create an alert for display on a user device when a syrup bag that is used to supply the beverage dispenser with syrup is approximately empty, and/or the level of carbon dioxide within the carbon dioxide tank that is used to supply carbon dioxide to carbonate the beverage has fallen below a desired threshold. In particular, because the pump that is used to pump syrup from the syrup bag through a syrup line and towards an outlet nozzle of the beverage dispenser is a diaphragm pump powered with the same compressed carbon dioxide that is used to carbonate the beverage, when the outlet nozzle is closed and the syrup bag is not empty, the pressure in the syrup line will be the same as the pressure of the carbon dioxide (i.e., the pressure in the syrup line will balance the pressure of the carbon dioxide). However, when the syrup bag is empty, the pump will not be able to create a pressure in the syrup line sufficient to balance the pressure of the carbon dioxide, and the measured pressure within the syrup line will fall below that of the carbon dioxide. At the same time, because the carbon dioxide that is used to power the pump is also used to carbonate the beverage, as the carbon dioxide is consumed the pressure measured within each syrup line (corresponding to the pressure of the carbon dioxide) will fall. Accordingly, when the measured pressure within one, but not all, syrup lines falls below a threshold, the system is configured to generate an alert identifying the syrup bag associated with that syrup line for replacement. On the other hand, when the measured pressure within all of the syrup lines falls below the threshold, the system is configured to generate an alert identifying the carbon dioxide tank for refill/replacement.

Because a quantity of syrup remains within the syrup line for a period of time following the emptying of the syrup bag, by generating the alert when an empty syrup bag is first detected, certain embodiments of the system may provide sufficient advanced notice of a need to refill/replace the syrup bag thereby reducing the likelihood that the beverage dispenser will run out of syrup. Furthermore, because a diaphragm pump operates when the pressures (carbon dioxide pressure and syrup pressure) are not equal, a pump connected to an empty syrup bag may operate continuously, resulting in unnecessary strokes and wasted carbon dioxide. Accordingly, by helping to ensure that empty syrup bags are consistently replaced in a timely manner, certain embodiments may extend the useful lifetime of the pumps in the system and help prevent carbon dioxide leaks from occurring within the system. Similarly, by generating the alert when the carbon dioxide pressure falls below the threshold, certain embodiments of the system reduce the likelihood that the carbon dioxide tank that is used to supply carbon dioxide to the system will reach an empty state.

Furthermore, because the demand for beverages may vary throughout the day, in certain embodiments, the system is configured to compare the carbon dioxide pressure to different thresholds, depending on the time of day. For example, the system may notify a user to refill/replace the carbon dioxide tank at a higher pressure threshold during the lunch hour, when demand for beverages is high, while the system may notify the user to refill/replace the carbon dioxide tank at a lower pressure threshold late at night, when demand for carbonated beverages may be low. In this manner, certain embodiments help to reduce the likelihood that the carbon dioxide tank will reach the empty state, while nevertheless avoiding the generation of unnecessary alerts. An embodiment of the system is described below.

According to an embodiment, a system for identifying a syrup bag of a beverage dispenser for replacement includes a first sensor and a computing system communicatively coupled to the first sensor. The first sensor is coupled to a first syrup line of the beverage dispenser. The first syrup line is coupled at a first end to a first syrup bag and coupled at a second end to a first pump. The first pump is configured to pump syrup from the first syrup bag to a first outlet of the beverage dispenser. The first sensor is configured to measure a first pressure within the first syrup line. The first pump is operated using pressurized gas that is associated with a given gas pressure. The first pump is configured to generate a pressure corresponding to the given gas pressure within the first syrup line when both the first syrup bag is full and the first outlet of the beverage dispenser is closed. The first sensor is also configured to transmit the measured first pressure across a network. The computing system includes memory and a hardware processor communicatively coupled to the memory. The memory stores a threshold pressure. The hardware processor receives the measured first pressure from the network. The hardware processor also determines that the measured first pressure is less than the threshold pressure. In response to determining that the measured first pressure is less than the threshold pressure, the processor transmits an alert for display on a user device. The alert identifies the first syrup bag for replacement.

The disclosed embodiments provide several practical applications and technical advantages. As an example, the disclosed system includes one or more pressure sensors to measure the pressures within syrup lines that carry syrup from syrup bags to the outlet nozzles of a beverage dispenser. Because the system relies on diaphragm pumps to pump the syrup from the syrup bags through the syrup lines and to the outlet nozzles, the disclosed system is able to leverage the fact that the pressure within the syrup lines will be the same as the pressure of the carbon dioxide used to power the pumps, provided the syrup bags are not empty, to obtain the pressure of the carbon dioxide. In particular, the system is able to determine both (1) when a syrup bag is empty-based on an observation that the pressure in the associated syrup line has fallen below a set threshold, while the pressure in the other syrup lines has not; and (2) when the carbon dioxide tank is approaching an empty state-based on an observation that the pressure in all of the syrup lines has fallen below the set threshold, without additionally relying on a separate sensor coupled to the carbon dioxide line. In this manner, certain embodiments conserve the processing and networking resources that would otherwise be expended by such an additional sensor.

As another example, certain embodiments automatically alert a worker when a syrup bag is empty, thereby enabling the worker to replace the bag in a timely manner. Because a pump connected to an empty syrup bag may operate continuously, consistent timely replacement of a syrup bag may improve the overall beverage dispensing system, by (1) extending the lifetime of the pumps within the system, and (2) helping to avoid carbon dioxide leaks within the system which may occur as a result of the continuous pump operation.

As another example, certain embodiments automatically cause an alert to appear on the screen of a user device, automatically cause the user device to generate a sound in response to receiving an alert, and/or automatically cause the user device to vibrate in response to receiving an alert. Accordingly, certain embodiments automatically inform a user of the alert, without requiring the user to repeatedly check his/her device to determine if an alert has been received, thereby conserving the computational resources otherwise expended during such actions.

As a further example, certain embodiments automatically adjust the threshold against which the pressure measurements are compared, based on demand for use of the beverage dispenser. For example, certain embodiment automatically lower the threshold against which the carbon dioxide pressure is compared. In this manner, certain embodiments help to reduce the likelihood that the carbon dioxide tank will reach the empty state, while nevertheless avoiding the generation of unnecessary alerts and thereby conserving the computational resources that would be associated with the generation of such unnecessary alerts.

Certain embodiments may include none, some, or all of the above technical advantages and practical applications. One or more other technical advantages and practical applications may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
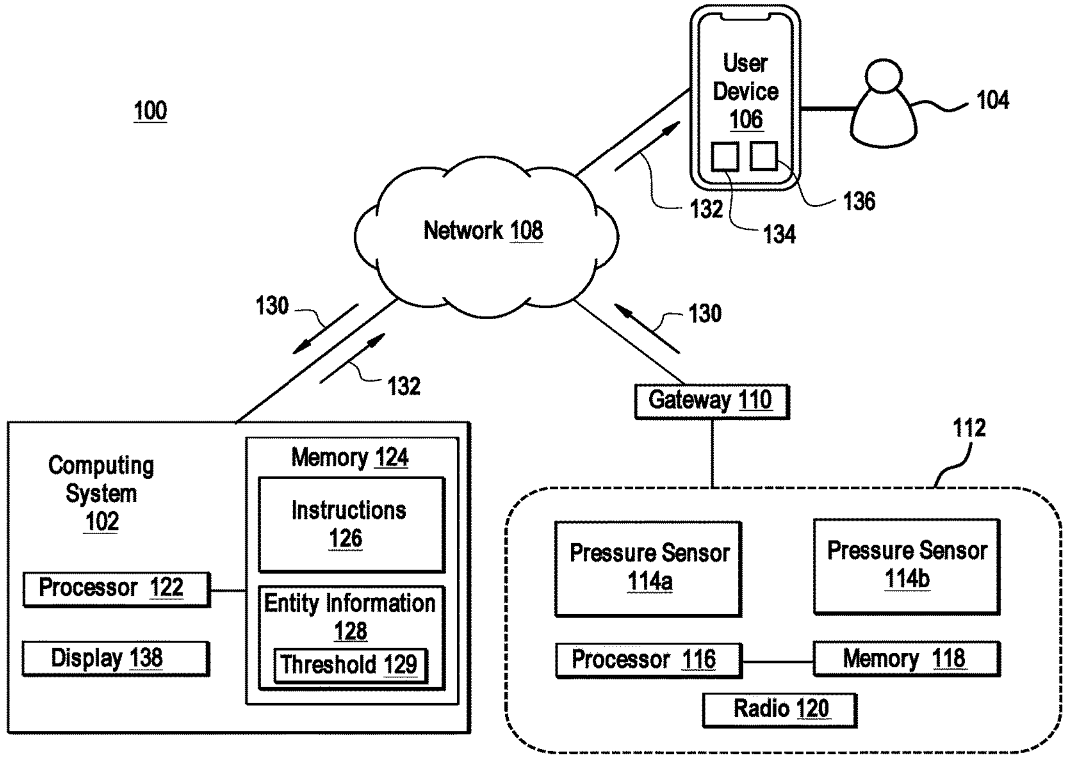
FIG. 1 is a schematic diagram of a beverage dispenser monitoring system, according to certain embodiments.
Figure 2:
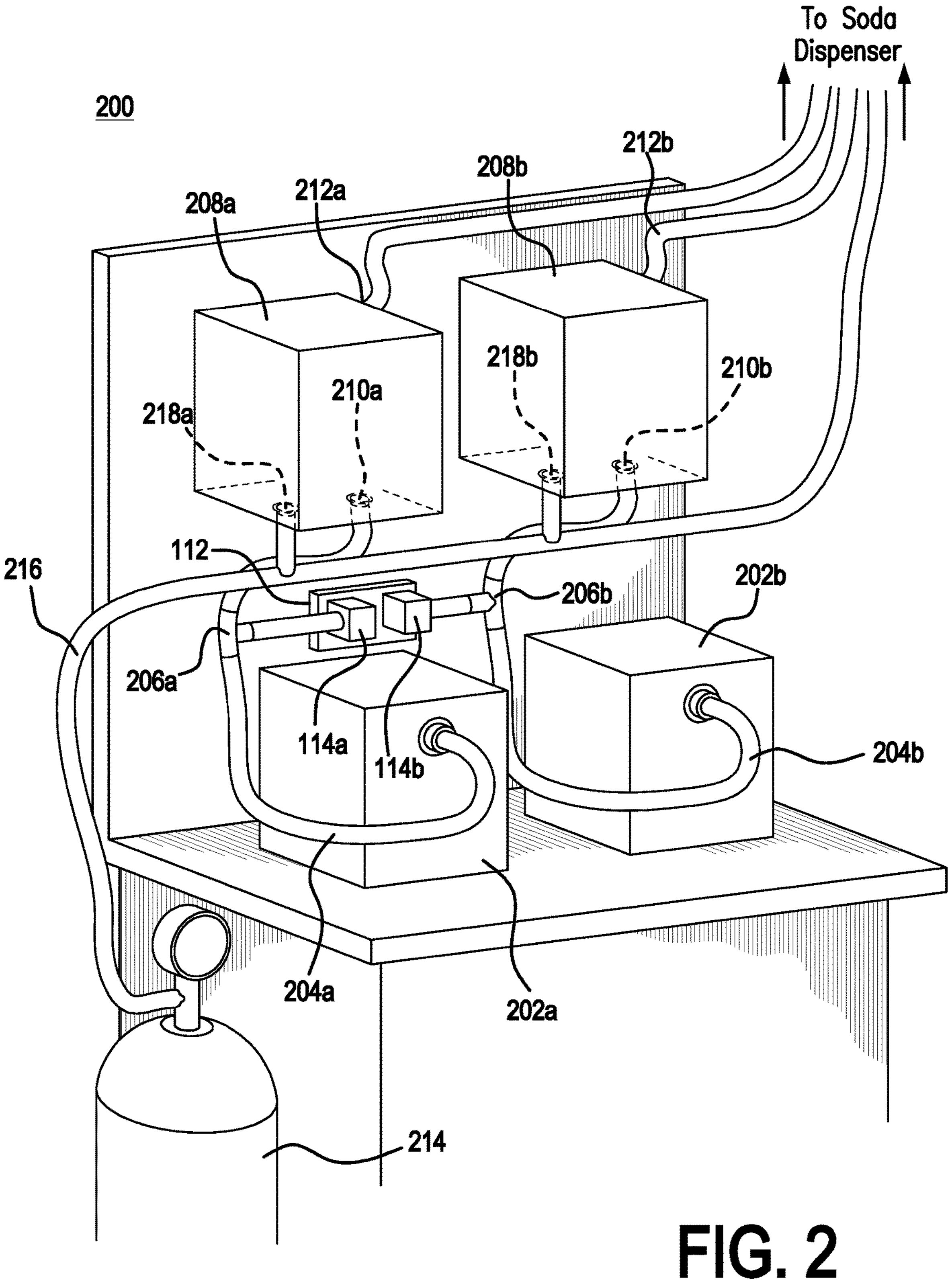
FIG. 2 illustrates sensors of the system of FIG. 1 coupled to the syrup lines of a beverage dispenser.
Figure 3:
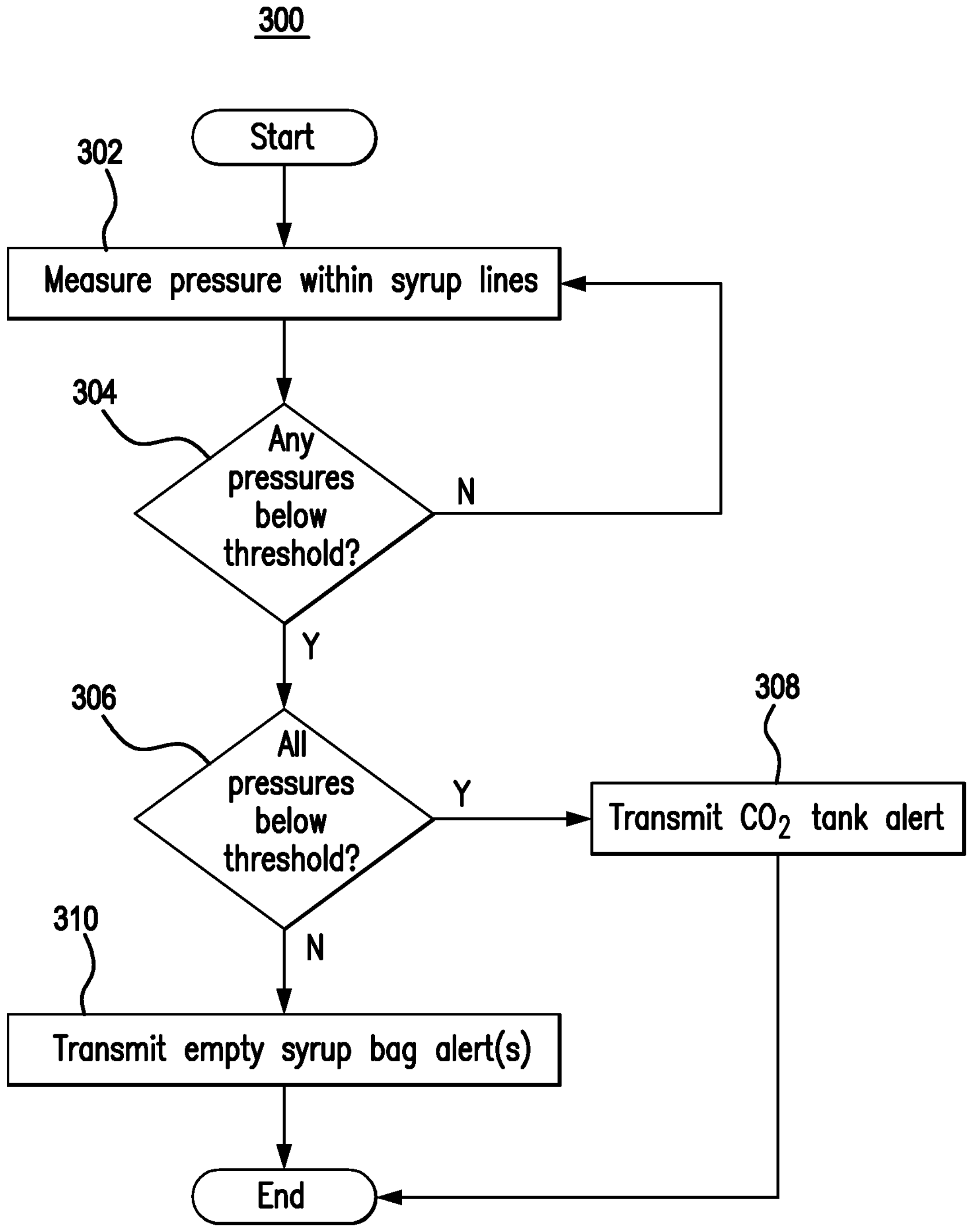
FIG. 3 illustrates a flowchart describing a method for monitoring the syrup and carbon dioxide levels of a beverage dispenser, according to certain embodiments

Embodiments of the present disclosure and its advantages are best understood by referring to FIGS. 1 through 3 of the drawings, like numerals being used for like and corresponding parts of the various drawings.

I. System Overview

FIG. 1 illustrates an example automatic beverage dispenser monitoring system 100 that is designed to automatically monitor the levels of syrup and carbon dioxide available to a beverage dispenser, and to alert a user device when one or more of the syrup bags and/or the carbon dioxide tank coupled to the beverage dispenser should be replaced, based on such monitoring. In this manner, certain embodiments of the system enable a worker to replace/refill syrup bags and/or carbon dioxide tank(s) that are used to provide syrup and carbon dioxide to a beverage dispenser before the beverage dispenser runs out of syrup and/or the carbon dioxide tank(s) reach an empty state, without requiring the worker to engage in proactive monitoring. Furthermore, because the pumps used in beverage dispensers are typically diaphragm pumps, which may operate continuously when connected to an empty syrup bag that is unable to provide pressure to balance the carbon dioxide pressure, by helping to ensure that empty syrup bags are consistently replaced in a timely manner, certain embodiments may extend the useful lifetime of the pumps in the system and help prevent carbon dioxide leaks from occurring within the system.

As illustrated in FIG. 1, automatic beverage dispenser monitoring system 100 includes computing system 102, user(s) 104, device(s) 106, network 108, gateway 110, and sensor device 112. Sensor device 112 includes two or more sensors *114a/b*, each of which is coupled to a syrup line that is used to supply a beverage dispenser with syrup, as illustrated in FIG. 2. Each sensor *114a/b* is configured to measure the pressure within the syrup line to which the sensor is coupled. Sensor device 112 is configured to transmit the pressure measurements made by sensors *114a/b* directly or indirectly to computing system 102 and/or device 106 using network 108 and/or gateway 110. Computing system 102 and/or device 106 is configured to use the pressure measurements to identify one or more of the syrup bags and/or carbon dioxide tank(s) that are used to supply the beverage dispenser with syrup and/or carbon dioxide for refill/replacement, as described in further detail below. As an example, in certain embodiments, device 106 is configured to use the measured pressures to identify one or more of the syrup bags and/or carbon dioxide tank(s) for refill/replacement, and automatically generate and display an alert 138 communicating such identification to user 104. As another example, in some embodiments, computing system 102 may provide information associated with the identifications of the one or more syrup bags and/or carbon dioxide tank(s) for refill/replacement to user device 106. For instance, computing system 102 may use the measured pressures to determine if any of the syrup bags and/or carbon dioxide tank(s) should be refilled/replaced, and transmit an alert 138 to user device 106 if it determines that such replacement should occur. The manner by which computing system 102 performs these functions is described in further detail below, and in the discussion of FIG. 3.

Device(s) 106 are used by user(s) 104 (e.g., workers within a physical location housing one or more cup dispensers) to communicate with remote computing system 102. As an example, user 104 may use device 106 to (1) receive an alert 138 from computing system 102 identifying a syrup bag for replacement and/or indicating that a fill level a carbon dioxide tank is below a desired threshold 129, and (2) display the alert to user 104. Device 106 may display alert 138 to user 104 in any suitable manner. For example, in certain embodiments, device 106 may generate a pop-up message that includes the alert, and automatically display the pop-up message on a screen of device 106. In some embodiments, device 106 may generate a sound and/or vibration in response to receiving alert 138. In certain embodiments, device 106 may display a graphical user interface (GUI) on a screen of device 106 within which the alert may be displayed. As further examples, in some embodiments, device 106 may receive alert 138 through an email and/or text message. After receiving the alert 138, user 104 may refill/replace the syrup bag or carbon dioxide tank associated with the alert.

In certain embodiments, device(s) 106 may receive the measurements 130 made by pressure sensors 114*a/b* and use those pressure measurements 130 to determine whether one or more of the syrup bags and/or carbon dioxide tank(s) that are used to supply the beverage dispenser with syrup and/or carbon dioxide should be refilled/replaced. For example, in such embodiments, memory 136 of device 106 may include instructions that, when executed by processor 134 of device 106, enable the device to determine, based on the received pressure measurements 130, whether one or more of the syrup bags and/or carbon dioxide tank(s) should be refilled/replaced. For example, the instructions (which may be the same or similar to instructions 126) stored in memory 136 may indicate that (1) a syrup bag should be identified for refill/replacement if the pressure measurement for it is below a threshold, while one or more of the other pressure measurements are above a threshold, and (2) the carbon dioxide tank should be identified for refill/replacement if all of the received pressure measurements are below the threshold. In response to identifying a syrup bag and/or a carbon dioxide tank for refill/replacement, device 106 may automatically generate and display an alert for user 104.

User device 106 is any appropriate device for communicating with components of remote computing system 102 over network 108, and notifying user 104 to an alert 138 received from remote computing system 102. For example, user device 106 may be a handheld computing device such as a smartphone, wearable computer glasses, a smartwatch, a tablet computer, a laptop computer, and the like. User device 106 may include an electronic display, a keypad, or other appropriate terminal equipment usable by user 104. For instance, the electronic display of user device 106 may be configured to display an alert 138 that is provided by remote computing system 102. In some embodiments, an application stored in a memory 134 of the device 106 and executed by a processor 136 of the device 106 may perform the functions described herein.

Network 108 allows communication between and amongst the various components of system 100. For example, remote computing system 110, user device 106, and gateway 110 may communicate via network 108. This disclosure contemplates network 108 being any suitable network operable to facilitate communication between the components of system 100. Network 108 may include any interconnecting system capable of transmitting audio, video, signals, data, messages, or any combination of the preceding. Network 108 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Sensor device 112 is a computing device that is coupled to a beverage dispenser BIB rack system (e.g., beverage dispenser BIB rack system 200, illustrated in FIG. 2). Sensor device 112 includes one or more sensors 114*a/b*, processor 116, memory 118, and radio 120. In general, sensor device 112 provides sensor data 130 to computing system 102 and/or user device 106. Various embodiments of sensor data 130 are described in further detail below.

Each sensor 114*a/b* is configured for sensing or measuring a pressure within a fluid. Each sensor 114*a/b* may be any suitable sensor configured for measuring an applied force per unit area of the syrup within the syrup line to which the sensor is coupled. For example, sensor 114*a/b* may correspond to a piezoresistive strain gauge sensor, a capacitive pressure sensor, an electromagnetic pressure sensor, a piezoelectric pressure sensor, a strain-gauge pressure sensor, and/or any other suitable type of pressure sensor. In certain embodiments each sensor 114*a/b* may additionally be configured to measure a temperate of the syrup within the syrup line to which the sensor is coupled.

Further details of the use of sensors 114*a/b*, including a description of the manner by which the sensors are coupled to the syrup lines of the beverage dispenser, are provided below, in the discussion of FIG. 2.

While FIG. 1 illustrates a pair of sensors 114*a* and 114*b*, this disclosure contemplates that sensor device 112 may include any suitable number and combinations of two or more sensors 114. Furthermore, while FIG. 1 illustrates each sensor 114*a* and 114*b* as sharing processor 120, memory 122, and radio 124, in certain embodiments, each sensor 114*a/b* may be associated with its own processor 120, memory 122, and/or radio 124 (e.g., each sensor 114*a/b* may operate independently of the other sensor 114*a/b*).

Sensor device 112 is configured to provide the pressures and/or temperatures measured by sensors 114*a/b* to remote computing system 102 and/or user device 106. These pressure and/or temperature measurements 130 may include any appropriate pressure values (e.g., Pascals, psi, etc.) and/or temperature values (e.g., Celsius, Fahrenheit, etc.). In some embodiments, sensor device 112 is configured to provide pressure and/or temperature measurements 130 automatically to computing system 102 and/or user device 106. For example, sensor device 112 may be configured to provide pressure and/or temperature measurements 130 to computing system 102 periodically (e.g., every five minutes), at random time intervals, and/or at any other suitable times. For instance, in some embodiments, in order to conserve power, sensor device 112 may be configured to provide pressure and/or temperature measurements 130 when certain conditions associated with the syrup lines to which the device is coupled are met (e.g., one or more of the measured pressures have fallen below a threshold value, one or more of the measured temperatures have risen above a threshold value). In some embodiments, sensor device 112 is configured to provide pressure and/or temperature measurements 130 to computing system 102 and/or user device 106 when requested to do so by the computing system/user device.

Sensor device 112 may be configured to operate in a manner that conserves power (e.g., battery power). For example, in some embodiments, sensor device 112 may remain in a low power consumption "sleep" mode for extended periods of time. While in sleep mode, sensor device 112 may consume less power by reducing or avoiding using components such as radio 120 and/or sensors 114*a/b*. In these embodiments, sensor device 112 may wake from the sleep mode after a predetermined amount of time (e.g., every five minutes), measure the pressures and/or temperatures within the syrup lines associated with the beverage dispenser, transmit measurements 130 to computing system 102 and/or device 106, and then return to sleep mode. As a result, embodiments of sensor device 112 that use batteries for power may be able to operate for a longer duration of time before requiring new batteries.

In certain embodiments, sensor device 112 (and/or the sensors 114*a/b* associated with the device) may operate as an Internet-of-Things (IoT) device. In general, IoT describes a network of physical objects (or "things") that are embedded with sensors, software, and other technologies for the purpose of connecting and exchanging data with other devices and systems over the internet. In embodiments where sensor device 112 is an IoT device, system 100 may include a gateway 110 for communicating with sensor device 112. Gateway 110 may be any appropriate IoT gateway, computer system, or electronic device that is capable of wirelessly communicating with sensor device 112 using any appropriate IoT communications protocol. Without limitations, the IoT communications protocol may include message queuing telemetry transport (MQTT), constrained application protocol (CoAP), advanced message queuing protocol (AMQP), data-distribution service (DDS), Zigbee, Z-Wave, lightweight machine-to-machine (LwM2M), or any combinations thereof. For example, sensor device 112 may wirelessly transmit measurements 130 to gateway 110, and gateway 110 may in turn send measurements 130 to computing system 102 via network 108. In other embodiments, sensor device 112 may not be an IoT sensor. In embodiments where sensor device 112 is not operable as an IoT sensor, sensor device 112 may transmit measurements 130 directly to computer system 102 via network 108 (e.g., without using gateway 110).

Sensor device 112 uses radio 120 to transmit measurements 130. Radio 120 is any transmitter or transceiver that is capable of wirelessly transmitting data. In some embodiments, for example, radio 120 is a Bluetooth transceiver. In these embodiments, measurements 130 are transmitted via Bluetooth to gateway 110 and/or remote computing system 102. In some embodiments, radio 120 is a Wi-Fi transceiver and measurements 130 are transmitted via Wi-Fi to gateway 110 and/or remote computing system 102.

Memory 118 of sensor device 112 may include any suitable set of instructions, logic, and/or code used by the device to perform the functions described herein. In particular embodiments, memory 118 may include a software application executable by processor 116 of sensor device 112 to perform one or more of the functions described herein.

While described above as providing measurements 130 to gateway 110 and/or computing system 102, in certain embodiments, sensor device 112 may be configured to perform one or more calculations on the measurements obtained from sensors 114*a/b*, and to transmit the results to gateway 110 and/or computing system 102. For example, in some embodiments, memory 118 may include instructions for comparing the pressure measurements obtained from sensors 114*a/b* to one or more thresholds 129, and determining whether any of the syrup bags and/or carbon dioxide tanks should be identified for refill/replacement, based on such comparison. As another example, in some embodiments, memory 118 may include instructions for comparing the temperature measurements obtained from sensors 114*a/b* to one or more thresholds 129, and determining whether to generate an alert based on such comparisons. In other embodiments, such comparisons/determinations are performed by computing system 102. Further details of the manner by which the pressure and/or temperature measurements obtained by sensors 114*a/b* of sensor device 112 are used to identify one or more syrup bags and/or carbon dioxide tanks for refill/replacement (either by computing system 102 and/or sensor device 112) are provided below, in the discussion of FIG. 2.

Computing system 102 may be any appropriate computing system in any suitable physical form. As an example and not by way of limitation, computing system 102 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computing system 102 may include one or more computing systems 102; be unitary or distributed; span multiple locations; span multiple machines; span multiple data centers; or reside in a cloud, which may include one or more cloud components in one or more networks. Where appropriate, one or more computing systems 102 may perform without substantial spatial or temporal limitation one or more steps of one or more methods described or illustrated herein. As an example and not by way of limitation, one or more computing systems 102 may perform in real time or in batch mode one or more steps of one or more methods described or illustrated herein. One or more computing systems 102 may perform at different times or at different locations one or more steps of one or more methods described or illustrated herein, where appropriate. In some embodiments, computing system 102 includes an electronic display 138 that may alternately or additionally display alert 138.

Computing system 102 may be physically located within the same physical building in which sensors 114*a/b* are located, or physically located at a location remote from the physical building in which sensors 114*a/b* are located. For example, in certain embodiments, computing system 102 may be located in one or more remote servers (e.g. in the cloud).

Processor 122 is any electronic circuitry, including, but not limited to a microprocessor, an application specific integrated circuits (ASIC), an application specific instruction set processor (ASIP), and/or a state machine, that communicatively couples to memory 124 and controls the operation of computing system 102. Processor 122 may be 8-bit, 16-bit, 32-bit, 64-bit or of any other suitable architecture. Processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 122 may include other hardware that operates software to control and process information. Processor 122 executes software stored in memory 124 to perform any of the functions described herein. Processor 122 controls the operation and administration of computing system 102 by processing information received from sensor device 112, gateway 110, network 108, user device 106, and/or memory 124. Processor 122 may be a programmable logic device, a microcontroller, a microprocessor, any suitable processing device, or any suitable combination of the preceding. Processor 122 is not limited to a single processing device and may encompass multiple processing devices.

Memory 124 may store, either permanently or temporarily, data such as pressure and/or temperature measurements 130, user preferences, operational software 126, and/or other information for processor 122. Memory 114 may include any one or a combination of volatile or non-volatile local or remote devices suitable for storing information. For example, memory 124 may include random access memory (RAM), read only memory (ROM), magnetic storage devices, optical storage devices, or any other suitable information storage device or a combination of these devices.

In certain embodiments, memory 124 may also store entity information 128. Entity information 128 may include any entity-specific information that may be used by computing system 102. As an example, in certain embodiments, entity information 128 may include one or more thresholds 129 against which computing system is configured to compare pressure and/or temperature measurements 130. Computing system 102 may use such thresholds to determine whether or not to generate an alert 132 to transmit to device 106. For example, in response to receiving pressure measurements from both sensor **114*a* and sensor 114*b* and determining that the pressure measurement received from sensor 114*a* is above a specified threshold 129 and that the pressure measurement received from sensor 114*b* is below the specified threshold 129 (conditions that together may indicate that the syrup bag associated with sensor 114*b* is approximately empty), computing system 102 may transmit an alert 132 to user device 106 identifying the syrup bag associated with sensor 114*b* to user 104 for refill replacement. On the other hand, in response to receiving pressure measurements from both sensor 114*a* and sensor 114*b* and determining that both pressure measurements are below the specified threshold 129 (conditions that may together indicate that the level of carbon dioxide within the carbon dioxide tank that is coupled to the beverage dispenser is below a certain level), computing system 102 may transmit an alert 132 to user device 106 indicating that the carbon dioxide level with the carbon dioxide tank is below the certain level. As another example, in response to receiving temperature measurements from sensors 114*a* and 114*b*, and determining that one or more of the measured temperatures are greater than a specified threshold, computing system 102 may transmit an alert 132 to user device 106** indicating that the temperature of the environment surrounding the associated syrup bag and/or syrup line is greater than desired.

In certain embodiments, entity information 128 may include a set of thresholds associated with the pressure of the carbon dioxide tank that is used to supply carbon dioxide to the beverage dispenser. When computing system 102 determines that the measured pressures 130 received from both sensors **114*a* and 114*b* are below a first threshold, the computing system 102 may be configured to compare the measured pressures 130 to one or more additional thresholds. For example, if the measured pressures 130 are below the first threshold but above a second threshold (e.g., a threshold associated with a tank at 40% capacity), computing system 102 may be configured to generate an alert 132 associated with a low level of severity. If the measured pressures 130 are both below the first threshold and the second threshold, but above a third threshold (e.g., a threshold associated with a tank at 25% capacity), computing system 102 may be configured to generate an alert 132 associated with a medium level of severity. If the measured pressures are both below all of the thresholds, computing system 102 may be configured to generate an alert 132 associated with a high level of severity. Device 106 may be configured to communicate alerts 132 to user 104 in different manners, depending on the severity level associated with the alert. For example, depending on the severity of a received alert 132, device 106 may be configured to (1) display the alert within a graphical user interface accessible to user 104 through device 106; (2) automatically generate an display a pop-up window that displays the alert; (3) generate a sound and/or vibration; and/or (4) perform any other suitable action to draw user 104**'s attention to the alert.

The threshold(s) included in entity information 128 may include static thresholds, time-dependent thresholds, and/or information from which time-dependent thresholds may be determined. For example, a given entity may be busier (e.g., more individuals may enter the physical building associated with the entity per unit time) during certain periods of the day, and/or during certain days of the week. For example, an entity such as a restaurant may be busier during the lunch hour than from 3:00-4:00 pm. Accordingly, the time-dependent threshold that triggers computing system 102 to send an alert 132 indicating that the carbon dioxide level within the carbon dioxide tank is low may be set at a higher value during such busier periods. For instance, the threshold for transmitting alert 132 to device 106 may be set at a value associated with a 30% capacity during busy periods, and a 10% during non-busy periods. Computing system 102 may identify busy periods in any suitable manner. For example, in certain embodiments, computing system 102 may automatically identify busy periods by monitoring the number of transactions that occur within the physical building associated with the entity over time. In some embodiments, computing system 102 may receive identifications of busy times from user 104.

Entity information 128 may also include information used by computing system 102 to determine the physical building from which pressure and/or temperature measurements 130 have been received, the specific syrup bag within the building that is associated with each pressure and/or temperature measurement 130, and the devices 106 to which the corresponding alerts 132 should be transmitted. As an example, in certain embodiments, for each physical building that computing system 102 is configured to monitor, entity information 128 may include identification numbers of the sensor devices 112 installed within the building, and the user devices 106 operated by workers 104 who work within the building. In such embodiments, sensor device 112 may be configured to transmit an identification number along with pressure and/or temperature measurements 130 to computing system 102. Computing system 102 may then use this identification information to identify the physical building within which sensor device 112 is installed, and the devices 106 to which alerts 132 may be sent. As another example, in certain embodiments, each sensor **114*a/b* may be associated with an identification number. In such embodiments, sensor device 112 may be configured to transmit the identification number of the sensor 114*a/b* from which each measurement 130 was obtained, along with the pressure and/or temperature measurements 130, to computing system 102. Computing system 102 may then use this identification information to identify the specific syrup bag (e.g., by type of syrup, etc.) within the physical building within which sensor device 112 is installed, that is associated with each pressure and/or temperature measurement 130**.

Modifications, additions, or omissions may be made to the systems described herein without departing from the scope of the invention. For example, system 100 may include any number of existing users 104, devices 106, networks 108, gateways 110, sensor devices 112, sensors 114_a/b_, processors 116, memories 118, radios 120, computing systems 102, processors 122, memories 124, and/or displays 138. The components may be integrated or separated. Moreover, the operations may be performed by more, fewer, or other components. Additionally, the operations may be performed using any suitable logic comprising software, hardware, and/or other logic.

II. Use of Sensor Measurements to Identify Syrup Bags and/or $CO_2$ Tanks for Refill/Replacement

A. Coupling Sensors to a Beverage Dispenser BIB Rack System

FIG. 2 illustrates an example beverage dispenser BIB rack system 200 that includes sensors 114_a_ and 114_b_. As illustrate in FIG. 2, beverage dispenser BIB rack system 200 includes a pair of syrup boxes 202_a_ and 202_b_, each housing a bag of syrup, syrup lines 204_a/b_ configured to transport syrup from syrup boxes 202_a/b_ to pumps 208_a/b_ through pump inlets 210_a/b_, a carbon dioxide tank 214, and a carbon dioxide line 216 configured to transport carbon dioxide to pumps 208_a/b_ through carbon dioxide inlets 218_a/b_. As illustrated in FIG. 2, each sensor 114_a/b_ is coupled to a syrup line 204_a/b_ using a T-connector 206_a/b_. T-connector 206_a/b_ may be any suitable T-connector configured to couple syrup lines 206_a/b_ to sensors 114_a/b_. Because each of T-connectors 206_a/b_ and sensors 114_a/b_ are in fluid communication with the syrup transported by syrup lines 204_a/b_, in certain embodiments, T-connectors 206_a/b_ and sensors 114_a/b_ are formed from food grade materials.

As illustrated in FIG. 2, for each syrup box 202_a/b_ and associated syrup line 204_a/b_ beverage dispenser BIB rack system 200 includes a sensor 114_a/b_. While FIG. 2 illustrates, for simplicity, a pair of syrup boxes 202_a/b_ and associated syrup lines 204_a/b_, this disclosure contemplates that beverage dispenser BIB rack system 200 may include any number of syrup boxes 202_a/b_ and associated syrup lines 204_a/b_, and therefore any number of sensors 114_a/b_. Each sensor 114_a/b_ is configured to measure the pressure and/or temperature of the syrup within the syrup line 206_a/b_ to which the sensor is coupled. Sensor device 112 is then configured to transmit these measured pressures and/or temperatures to gateway 110 and/or computing system 102, as described above, in the discussion of FIG. 1.

B. Identifying a Syrup Bag and/or the Carbon Dioxide Tank for Refill/Replacement.

As explained above, in the discussion of FIG. 1, computing system 102 is configured to use the pressures measured by sensors 114_a_ and 114_b_ to identify a syrup bag housed within a syrup box 202_a/b_, and/or carbon dioxide tank 214 for refill/replacement. In particular, because pumps 208_a_ and 208_b_ are diaphragm pumps powered by the carbon dioxide provided by tank 214, the pressure of the syrup within syrup lines 204_a_ and 204_b_ should be approximately the same as the pressure of the carbon dioxide within tank 214, when the system is closed (e.g., when the beverage dispenser is not dispensing beverages), and the syrup bags housed within syrup boxes 202_a_ and 202_b_ are not empty. This is because each pump 208_a/b_ is configured to pump syrup from syrup boxes 202_a/b_ until the pressure of the syrup within syrup line 206 balances the pressure from the carbon dioxide within the system. Accordingly, when the syrup bags housed within syrup boxes 202_a/b_ are not empty, the pressures measured by sensors 114_a/b_ correspond approximately to the pressure of the carbon dioxide within tank 214. However, when a syrup bag housed within a syrup box 202_a_ empties, there will likely not be enough syrup within the associated syrup line 206_a_ to balance the pressure of the carbon dioxide. Accordingly, the pressure measured by the corresponding sensor 114_a_ will drop. Thus, when the pressure measured by one of sensors 114_a_ and 114_b_ falls below a threshold, while the pressure measured by the other sensor remains above the threshold, this indicates that associated syrup box 202_a_ or 202_b_ is likely empty. On the other hand, when the pressure measured by both of sensors 114_a_ and 114_b_ falls below the threshold, this indicates that the pressure of the carbon dioxide within the system has dropped below the threshold. Thus, the pressure measurements provided by sensors 114_a/b_ may be used to identify both empty syrup bags/boxes 202_a/b_ and low levels of carbon dioxide within tank 214.

In certain embodiments, prior to determining that a given syrup bag/box 202_a/b_ is empty and/or that the level of carbon dioxide within tank 214 is low, computing system 102 is configured to receive additional pressure measurements from sensors 114_a/b_ and to determine that the additional pressure measurements do not indicate a rise in the pressure of the syrup within the corresponding syrup line 204_a/b_. In particular, when a nozzle of the beverage dispenser is opened (causing syrup to flow towards the nozzle), the pressure within the associate syrup line will experience a drop, before the corresponding pump 208_a/b_ is able to operate to increase the pressure within syrup line 204_a/b_ to balance the pressure of the carbon dioxide gas powering the pump. Accordingly, in certain embodiments, multiple pressure measurements are used to identify pressure drops that are associated with empty syrup bags/boxes 202_a/b_ and/or low carbon dioxide fill levels, rather than temporary pressure drops associated with the regular operation of the beverage dispenser.

III. Method for Automatically Identifying Syrup Bags and/or Carbon Dioxide Tanks for Refill/Replacement FIG. 3 illustrates an example method 300 (described in conjunction with elements of FIGS. 1 and 2) for automatically monitoring a beverage dispenser BIB rack system 200 and alerting user 104 when a syrup bag housed within a given syrup box 202_a/b_ should be refilled/replaced and/or when the carbon dioxide level within a carbon dioxide tank 214 used within the beverage dispenser BIB rack system 200 falls below a desired level.

During operation 302, the system uses sensors 114_a_ and 114_b_ to measure pressures within syrup lines 204_a_ and 204_b_. Sensor device 112 then transmits these measured pressures to computing device 102. During operation 304, computing device 102 determines whether any of the measured pressures are below a specified threshold 129. If, during operation 304, computing device 102 determines that none of the measured pressures are below the specified threshold 129, method 300 returns to operation 302 and the system continues to monitor the pressure within syrup lines 204_a_ and 204_b_.

On the other hand, if, during operation 304, computing device 102 determines that one or more of the measured pressures are below the specified threshold 129, during operation 306, computing device 102 determines whether all of the measured pressures are below the specified threshold 129. If, during operation 306, computing device 102 determines that all of the measured pressures are below the specified threshold 129, computing system 102 determines that the pressure of the carbon dioxide provided by carbon dioxide tank 214 is below the specified threshold 129. Accordingly, during operation 308, computing system 102 transmits and alert 132 to user device 106 indicating that the pressure (and correspondingly amount) of carbon dioxide within carbon dioxide tank 214 is less than desirable.

On the other hand, if, during operation 306 computing system 102 determines that less than all of the measured pressures are below the specified threshold 129 (e.g., the pressure measured by sensor 114*a* is below the specified threshold 129, while the pressure measured by sensor 114*b* is above the specified threshold 129), computing system 102 determines that the syrup bag(s) associated with the measured pressures that are below the specified threshold 129 are approximately empty. Accordingly, during operation 310, computing system 102 transmits an alert 132 to user device 106 identifying the empty syrup bag(s)/boxes 204 to user 104 for refill/replacement.

Modifications, additions, or omissions may be made to the methods described herein without departing from the scope of the disclosure. The methods may include more, fewer, or other operations. Additionally, operations may be performed in any suitable order. That is, the operations of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for identifying a syrup bag of a beverage dispenser for replacement, the system comprising:
- a gas tank configured to supply a pressurized gas at a given gas pressure to a first pump via a gas supply line;
- a first sensor coupled to a first syrup line of the beverage dispenser, the first syrup line coupled at a first end to a first syrup bag and coupled at a second end to the first pump configured to pump syrup from the first syrup bag to a first outlet of the beverage dispenser, the first sensor configured to:
  - measure a first pressure within the first syrup line, wherein the first pump is operated using the pressurized gas at the given gas pressure and the first pump is configured to generate within the first syrup line a pressure substantially equivalent to the given gas pressure when the first syrup bag is not empty and the first outlet of the beverage dispenser is closed; and
  - transmit the measured first pressure across a network; and
- a computing system communicatively coupled to the first sensor, the computing system comprising:
  - a memory configured to store a threshold pressure; and
  - a hardware processor communicatively coupled to the memory, the hardware processor configured to:
    - receive the measured first pressure from the network;
    - determine that the measured first pressure is less than the threshold pressure; and
    - in response to determining that the measured first pressure is less than the threshold pressure, transmit an alert for display on a user device, the alert identifying the first syrup bag for replacement.

2. The system of claim 1, further comprising a second sensor coupled to a second syrup line of the beverage dispenser, the second syrup line coupled at a first end to a second syrup bag and coupled at a second end to a second pump configured to pump syrup from the second syrup bag to a second outlet of the beverage dispenser, the second sensor configured to:
- measure a second pressure within the second syrup line, wherein the second pump is operated using the pressurized gas and is configured to generate within the second syrup line the pressure substantially equivalent to the given gas pressure when the second syrup bag is not empty and the second outlet of the beverage dispenser is closed; and
- transmit the measured second pressure within the second syrup line across the network, wherein:
  - the hardware processor is further configured to:
    - receive the measured second pressure within the second syrup line from the network; and determine that the measured second pressure within the second syrup line is greater than the threshold pressure; and wherein the alert identifying the first syrup bag for replacement is further transmitted in response to the processor determining that the measured second pressure within the second syrup line is greater than the threshold pressure.

3. The system of claim 1, further comprising a second sensor coupled to a second syrup line of the beverage dispenser, the second syrup line coupled at a first end to a second syrup bag and coupled at a second end to a second pump configured to pump syrup from the second syrup bag to a second outlet of the beverage dispenser, the second sensor configured to:

measure a second pressure within the second syrup line, wherein the second pump is operated using the pressurized gas and is configured to generate within the second syrup line the pressure substantially equivalent to the given gas pressure when the second syrup bag is not empty and the second outlet of the beverage dispenser is closed; and transmit the measured second pressure within the second syrup line across the network, wherein:

the first sensor is further configured to:

measure a third pressure within the first syrup line, wherein the first pressure within the first syrup line was measured at a first time, and the third pressure within the first syrup line was measured at a second time different than the first time; and transmit the third pressure within the first syrup line across the network; and the hardware processor is further configured to:

receive the measured second pressure within the second syrup line from the network;

receive the measured third pressure within the first syrup line from the network;

determine that the measured second pressure within the second syrup line is less than the threshold pressure;

determine that the measured third pressure within the first syrup line is less than the threshold pressure; and in response to determining that the measured second pressure within the second syrup line is less than the threshold pressure and that the measured third pressure within the first syrup line is less than threshold pressure, transmit a second alert for display on the user device, the second alert identifying the gas tank for replacement.

4. The system of claim 1, wherein:

the first sensor is further configured to:

measure a second pressure within the first syrup line, the first pressure within the first syrup line measured at a first time, the second pressure within the first syrup line measured at a second time later than the first time; and transmit the second pressure within the first syrup line across the network; and the hardware processor is further configured to:

receive the measured second pressure within the first syrup line from the network; and determine that the measured second pressure within the first syrup line is less than the threshold pressure, wherein transmitting the alert for display on the user device is further performed in response to determining that the measured second pressure within the first syrup line is less than the threshold pressure.

5. The system of claim 1, further comprising a second sensor configured to:

measure a temperature of the syrup within the first syrup line; and transmit the measured temperature across the network;

the memory is further configured to store a maximum temperature; and the hardware processor is further configured to:

receive the measured temperature from the network;

compare the measured temperature to the maximum temperature; and in response to determining that the measured temperature is greater than the maximum temperature, transmit a second alert for display on the user device, the second alert indicating that an environment of the first syrup bag is above the maximum temperature.

6. The system of claim 1, wherein the first sensor is coupled to the first syrup line using a T connector.

7. The system of claim 1, wherein the first sensor is configured to measure the first pressure within the first syrup line at regular intervals of time.

* * * * *